No. 716,453. Patented Dec. 23, 1902.
G. E. MANWARING.
PROCESS OF AUDITING COLLECTORS' RECEIPTS.
(Application filed Jan. 15, 1902.)
(No Model.) 2 Sheets—Sheet 1.

Fig. 1.

STAMP

Messrs ------

Serial No. ------
Collector's No. ------
Received from ------
------ Dollars
In payment of ------
THE AMERICAN AUDIT CO.
By ------ Collector IMPORTANT. The Collector will give you this receipt with the attached card which please mail at once. On receipt of same payment will be confirmed by the Cashier.

Serial No. ------
Collector's No. ------
Receipt given to ------
for ------ Dollars
In payment of ------
Date ------ 190
------ Collector

Fig. 2.

Serial No. ------
Collector's No. ------

PLEASE CONFIRM PAYMENT MADE
THIS DAY

WITNESSES:
J. O. Templer
[signature]

INVENTOR
Giles E. Manwaring
BY
Kenyon & Kenyon
ATTORNEYS

No. 716,453. Patented Dec. 23, 1902.
G. E. MANWARING.
PROCESS OF AUDITING COLLECTORS' RECEIPTS.
(Application filed Jan. 15, 1902.)
(No Model.) 2 Sheets—Sheet 2.

THE AMERICAN AUDIT CO
EXPERT ACCOUNTANTS & AUDITORS
100 BROADWAY
N.Y.CITY.

..........................190

M...................................

..........................................

..........................

We herewith confirm payment of

..............................................................Dollars for which you hold Collector's Receipt No....................

Serial No...................in payment of bills

.........................................................................................

Respectfully

THE AMERICAN AUDIT CO.

By..................................Treasurer.

Please compare the above with Collector's receipt, if any difference appears advise us at once.

Fig. 3.

WITNESSES: INVENTOR
Giles E. Manwaring
BY
Kenyon & Kenyon
ATTORNEYS

UNITED STATES PATENT OFFICE.

GILES E. MANWARING, OF LYNBROOK, NEW YORK.

PROCESS OF AUDITING COLLECTORS' RECEIPTS.

SPECIFICATION forming part of Letters Patent No. 716,453, dated December 23, 1902.

Application filed January 15, 1902. Serial No. 89,816. (No model.)

*To all whom it may concern:*

Be it known that I, GILES E. MANWARING, a citizen of the United States, and a resident of Lynbrook, Nassau county, State of New York, have invented a Process of Auditing Collectors' Receipts, of which the following is a specification.

The object of my invention is to provide a simple system of auditing and checking collectors' receipts.

It relates to a plurality of separable coupons bearing certain matter and which are filled out by the collectors at the time of the transaction to be audited, whereby when the steps are completed in the use of the coupons the house, firm, or bank for whom the collection is made is brought directly in touch with its patron or customer. Thus a means is provided whereby the amount paid by the patron or customer to the collector may be checked by the other contracting party.

My invention is illustrated in the accompanying drawings.

The same letters of reference found in the different figures refer to the same parts of my invention.

Figure 1 illustrates a book or pamphlet containing the coupon-slips. The upper cover is shown as partly broken away. Fig. 2 shows one side of the postal coupon. Fig. 3 shows the blank letter of confirmation.

The system of auditing consists of a series of coupons $a$ $b$ $c$, which are printed on strips. On each of the coupons are printed the words "Serial No..." and "Collector's No..." In the blanks opposite to these words are to be inserted the number of the particular volume in which the account with that patron whose transaction is to be audited is kept and the number of the particular collector or agent making the collection and as given to him by the central house or firm. Any other designating terms or designating numbers may be substituted for those just mentioned.

On the coupon $a$ are found the words "Receipt given to...... for.... dollars. In payment of....... Date,....190.. ......, collector." When a sale or transaction takes place, the blanks opposite the words just mentioned are filled out. When the coupon is completed, it constitutes an acknowledgment of the issue of a receipt for moneys paid as well as a minute of the transaction.

Coupon $b$ is a receipt for the moneys paid to the collector. It is signed as of the house by the collector. The signature of the house, however, may be printed on the coupon and the receipt signed by the collector only. The following words are printed on the receipt-coupon. "......190.. Received from...... ....dollars, in payment of....... The American Audit Co., by......, collector." The coupon thus constitutes a receipt for the moneys paid by the patron to the collector or other agent of the central bank or firm. At the bottom of the coupon are printed instructions to the collector or patron, or both. These instructions may be of any character, provided they direct the instructed party or parties to properly carry out the step or steps in the auditing system. The directions selected for the purpose of illustration are as follows: "Important. The collector will give you this receipt with the attached card, which please mail at once. On receipt of same, payment will be confirmed by the cashier."

Coupon $c$ is a postal coupon to be sent to the central house or firm. It is addressed on one side and has a printed request, as well as a notice of payment, on the other. The address may be permanently printed on the coupon, or a place may be provided, as illustrated in the drawings. In the illustration there are blanks to indicate the place for the address opposite and under the word "Messrs." A place for the stamp is also indicated in the upper right-hand corner of the address side of the coupon. The coupon thus constitutes a postal coupon. On the opposite side of the coupon are printed beside the words "Serial No. ..." and "Collector's No. ..," referred to above, the words "Please confirm payment made this day." This may or may not be signed by the patron or customer.

The words "Payment made this day" constitute a notice to the central firm or house that payment was made by the patron to the collector whose designating numbers or terms are inserted at the top of the coupon.

The coupons may be printed on one sheet and made detachable in any of the well-known ways. The sheets may be bound together to form a book or pamphlet, as illustrated in Fig. 1. In the figure, *d d* illustrate the covers. *e* indicates the bound slips, part of which have been detached, leaving their stub-coupons *a* in the book. This book is carried by the collector or agent, and when money is received by him for the central house he fills out the blanks and tears off coupons *b c* from the stub *a*. The stub is left in the book, which is ultimately returned to the house, firm, or bank. Coupons *b c* are given by the collector to the patron, who separates coupon *c* from coupon *b* and sends coupon *c* to the house, as addressed.

The house upon receiving the postal coupon confirms the payment of the money made by the patron, as requested in the coupon. This is done by sending the letter shown in Fig. 3, with the blanks filled out. This letter contains the following printed words: "...... 190... M....... We herewith confirm payment of ...... dollars, for which you hold collector's receipt No. .., in payment of bills. Respectfully, The American Audit Co., by ......, treasurer." It also contains such words of a directive character as occasion may require. This brings the house directly in touch with its patron and completes a most efficient and ready means of auditing and checking collectors' receipts.

In order to properly warn the patron or transferee of goods and place him in a position of responsibility, there are printed on the bill or other paper of transfer such words that will direct him in the proper performance of his acts in the auditing system. The following words if printed on the transfer-paper would produce the necessary precaution on the part of the transferee and would make him responsible for any lack of care on his part. "Important. Pay no money to our salesman or collector unless a receipt is given by him on our printed form with postal card attached ready for mailing. All receipts given by collector or salesman will be confirmed as to correctness. By following this method, errors are averted and the proper account credited."

The system can be varied by those skilled in the art without departing from the spirit of my invention. It also can be used with many forms of transactions.

What I claim as new, and desire to secure by Letters Patent, is—

1. As an article of manufacture, a book having slips formed into severable coupons, one of said coupons bearing matter constituting a receipt for moneys paid, another of said coupons bearing matter constituting an acknowledgment of issue of said receipt, and another of said coupons bearing matter constituting a postal coupon and having on one side a blank for an address and on the other a notice of payment of said moneys.

2. In a system for checking collectors' receipts, a series of coupons for each transaction, one of said coupons bearing matter constituting a receipt, another of said coupons bearing matter constituting a postal coupon, and having a notice of payment and a letter of confirmation of said payment.

3. In a system for checking collectors' receipts, a series of coupons for each transaction, one of said coupons bearing matter constituting a receipt for moneys paid, another of said coupons bearing matter constituting an acknowledgment of issue of said receipt and a minute of the said transaction, and another of said coupons bearing matter constituting a postal coupon having an address side and on the opposite side a notice of payment of said moneys.

4. In a system for checking collectors' receipts, a series of coupons for each transaction, one of said coupons bearing matter constituting a receipt for moneys paid, another of said coupons bearing matter constituting an acknowledgment of issue of said receipt, and another of said coupons bearing matter constituting a postal coupon having an address side and on the opposite side a notice of payment of said moneys, and a letter of confirmation of said payment.

5. In a system for checking collectors' receipts, a series of coupons for each transaction, one of said coupons bearing matter constituting a receipt for moneys paid, another of said coupons bearing matter constituting an acknowledgment of issue of said receipt and a minute of the said transaction, and another of said coupons bearing matter constituting a postal coupon having an address side and on the opposite side a notice of payment of said moneys, and a letter of confirmation of said payment.

6. In a system for checking collectors' receipts, a transfer-paper having directions for the transferee, a series of coupons, one of said coupons bearing matter constituting a receipt for moneys paid, another of said coupons bearing matter constituting an acknowledgment of issue of said receipt, and another set of coupons bearing matter constituting a postal coupon having an address side and on the opposite side a notice of payment of said moneys, and a letter of confirmation of said payment.

In testimony whereof I have signed my name to this specification in the presence of two subscribing witnesses.

GILES E. MANWARING.

Witnesses:
EDWIN SEGER,
ARTHUR F. TOMLINSON.